United States Patent
Ma et al.

(10) Patent No.: US 11,883,915 B2
(45) Date of Patent: Jan. 30, 2024

(54) ROTATING POWER CONNECTOR FOR WELDING TORCH CABLES

(71) Applicant: Illinois Tool Works Inc., Glenview, IL (US)

(72) Inventors: Tiejun Ma, Tecumseh (CA); Romeo Cossette, Amherstburg (CA); Craig Matthew Bondy, Windsor (CA)

(73) Assignee: Illinois Tool Works Inc., Glenview, IL (US)

( * ) Notice: Subject to any disclaimer, the term of this patent is extended or adjusted under 35 U.S.C. 154(b) by 338 days.

(21) Appl. No.: 17/411,384

(22) Filed: Aug. 25, 2021

(65) Prior Publication Data

US 2022/0080521 A1     Mar. 17, 2022

Related U.S. Application Data

(60) Provisional application No. 63/077,353, filed on Sep. 11, 2020.

(51) Int. Cl.
    *B23K 9/32*         (2006.01)
    *H01R 35/04*     (2006.01)

(52) U.S. Cl.
    CPC .............. *B23K 9/323* (2013.01); *H01R 35/04* (2013.01); *B23K 9/325* (2013.01)

(58) Field of Classification Search
    CPC .......... B23K 9/323; B23K 9/325; B23K 9/32; B23K 37/0241; B23K 9/28; H01R 35/04; H01R 13/111; H01R 39/64
See application file for complete search history.

(56) References Cited

U.S. PATENT DOCUMENTS 3,909,585 A * 9/1975 Sanders ................. B23K 9/291
                                              138/120
4,336,974 A * 6/1982 Wilson ................... H01R 39/64
                                              439/675

(Continued)

FOREIGN PATENT DOCUMENTS

| AT | 509982 | 1/2012 |
|---|---|---|
| DE | 4325289 | 4/1995 |
| WO | 2018224266 | 12/2018 |

OTHER PUBLICATIONS

Extended European Search Report Appln No. 21194991.2 dated Feb. 9, 2022.

(Continued)

*Primary Examiner* — Travis S Chambers
(74) *Attorney, Agent, or Firm* — McAndrews, Held & Malloy, Ltd.

(57) ABSTRACT

A rotating power connection for connecting an electrical supply power cable to an electric welding torch body is provided. In the rotating power connection, the mechanical load is carried by steel bearings, and the electric load is carried by multi-contact, spring loaded fins made out of highly conductive materials or coatings. In some examples, a rotating power connector is affixed to a torch before the power connection to a wire feeder. The rotating power connector advantageously allows for rotation of the welding torch relative to the unicable while providing continual electrical connection at the high current levels employed in welding applications.

20 Claims, 6 Drawing Sheets

(56) References Cited

U.S. PATENT DOCUMENTS

| | | | |
|---|---|---|---|
| 4,549,068 A * | 10/1985 | Kensrue | B23K 9/323 |
| | | | 219/137.31 |
| 7,665,996 B2 | 2/2010 | Jaeger | |
| 2013/0102181 A1 | 4/2013 | Aimoto | |
| 2018/0133830 A1* | 5/2018 | Solis, Jr. | B23K 9/295 |

OTHER PUBLICATIONS

Tregaskiss, Technical Guide, Tough Gun™ ThruArm™ G1 Series Robotic MIG Guns for Fanuc® Robots 100iC, 100iC-12, 100iC-6L, 100iC-7L, 120iC, 120iC-10L, 120iC-12L, Jun. 2014.

* cited by examiner

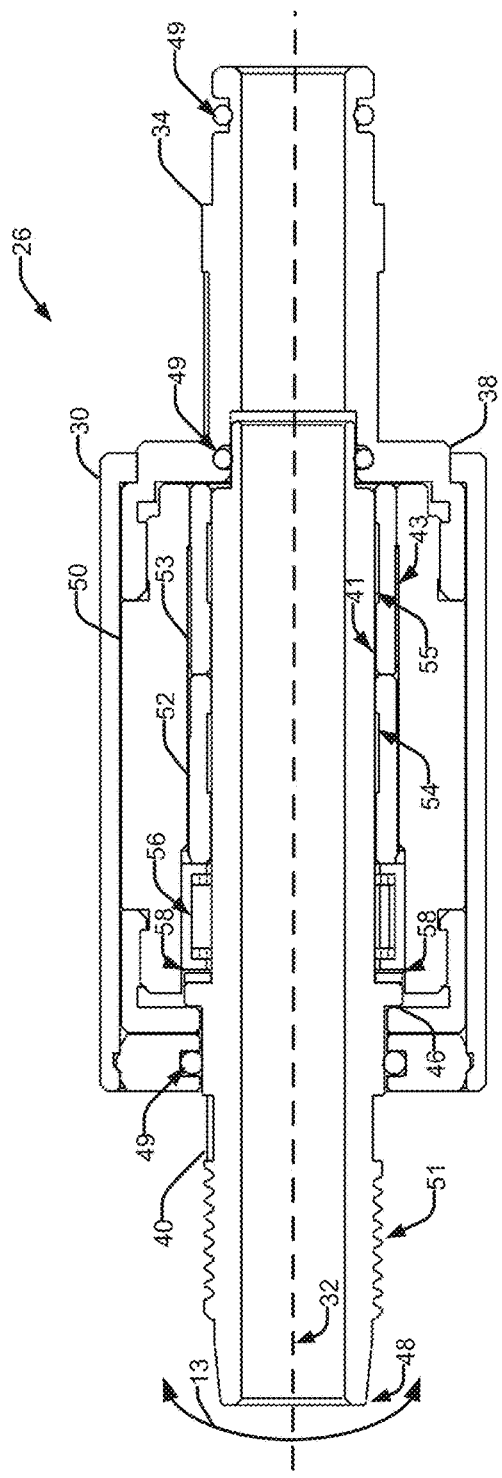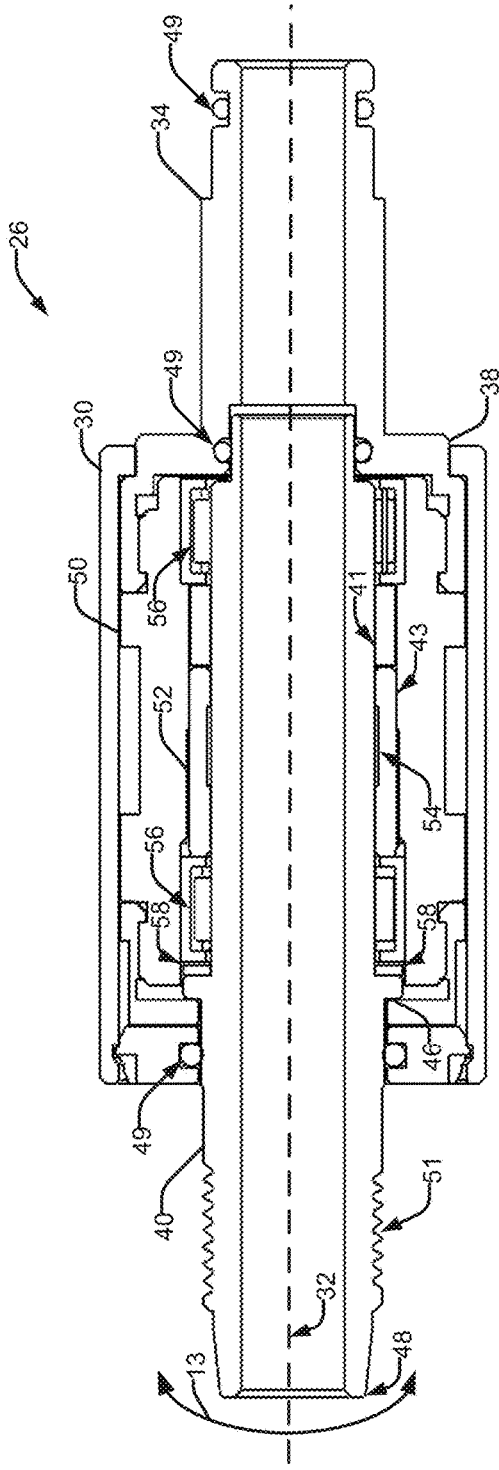
FIG. 2A
FIG. 2B

ROTATING POWER CONNECTOR FOR WELDING TORCH CABLES

CROSS-REFERENCE TO RELATED APPLICATIONS

This application hereby claims priority to and the benefit of U.S. Provisional Application Ser. No. 63/077,353, entitled "ROTATING POWER CONNECTOR FOR WELDING TORCH CABLES," filed Sep. 11, 2020. U.S. Provisional Application Ser. No. 63/077,353 is hereby incorporated by reference in its entireties for all purposes.

BACKGROUND

In an electric arc welding process, it is known to use a power cable for conducting current, shielding gas, and electrode wire through a welding torch. The power cable is often referred to as an unicable for an air-cooled torch, which generally includes a core tube, copper cabling, lead wires, and insulation jacket. Typically, such a cable is connected to other torch parts by way of either a crimped or threaded compression fitting. One end of the cable is fastened to a wire feeder by way of a mating pin (or power pin), and the other end is fastened to a torch body with a gooseneck or conductor tube of the welding torch. These connections are fixed and unmoving.

The power cable provides major flexibility to the torch, such that the welding arc can be applied at various locations. However, conventional fixed connections limit the torsional movement of the copper bundles within the unicables and creates stress concentration, leading to eventual failure of the electrical connection of the welding torch. Conventional cables are installed in fixed positions, and during manipulation of the torch by a user or a robot, the cable twists as the torch is turned. In some robotic designs, this is problematic as the cable can be subjected to severe mechanical wear such that the fixed cable connections or the unicable fail. In the case of a coaxial mounted welding torch, any rotation of the robot axis that is coaxial with the cable puts rotational torque on the cable. When the cable is twisted at a bended contour, the twist strain/stress concentrates at one end, and causes mechanical fail of the cable.

SUMMARY

The present disclosure provides a rotating power connection that may be secured to a torch, such as between the torch body and the unicable, or behind the handle. The present disclosure advantageously allows for rotation of the welding torch body relative to the unicable without breaking electrical contact or putting unnecessary strain on the unicable. For example, with the torch mounted on a robot arm, the rotating power connection allows the torch body to rotate with the axis of rotation of the robot, while the unicable does not, thereby eliminating any torque in the unicable and reducing mechanical wear of the unicable.

These and other features and advantages of the invention will be more fully understood from the following detailed description of the invention taken together with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 2A and 2B illustrate sectional views of example rotating power connectors, in accordance with aspects of this disclosure.

The figures are not necessarily to scale. Where appropriate, similar or identical reference numbers are used to refer to similar or identical components.

DETAILED DESCRIPTION

Figure 1:
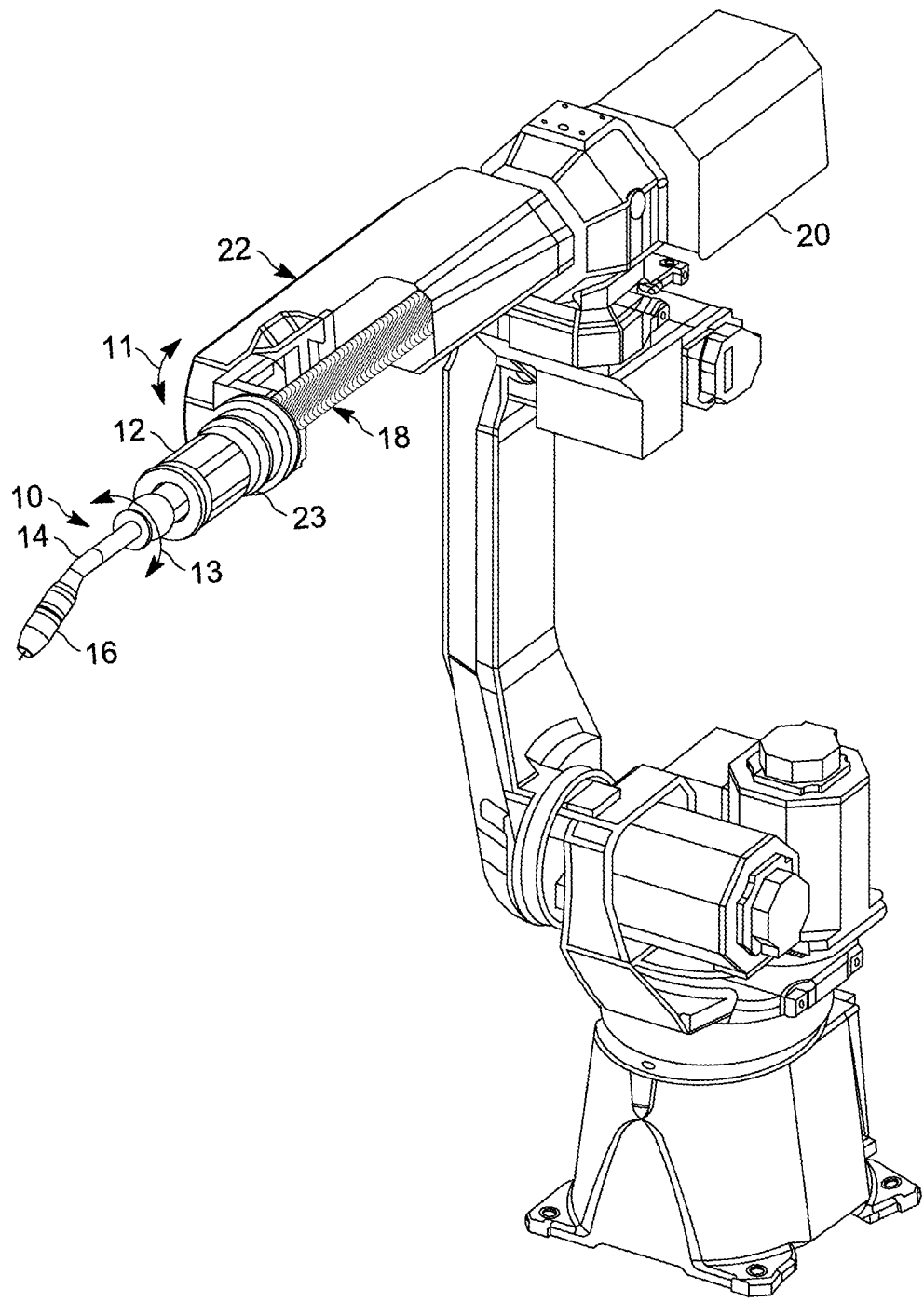
FIG. 1 illustrates an example robotic welding system, in accordance with aspects of this disclosure.

This disclosure relates to electric welding generally, and more particularly to rotating power connections for connecting an electrical supply power cable to an electric welding torch body. In particular, a rotating power connector is disclosed that may be affixed to a torch behind the gooseneck or torch body. The disclosed rotating power connector advantageously allows for rotation of the welding torch relative to the unicable while providing continual electrical connection at the high current levels employed in welding applications.

In some examples, the torch is mounted on a robotic arm of a robotic welding system, the rotating power connector allowing the torch body to rotate with the axis of rotation of the robotic arm without twisting the unicable, thereby mitigating torque on the unicable from the rotation and reducing mechanical wear on the unicable.

In some examples, the rotating power connector includes a generally cylindrical outer housing having a longitudinal axis. A connector pin is arranged within the outer housing, extending from a first end of the outer housing. A rotating stud is rotatably arranged within the outer housing extending from a second end of the outer housing opposite the first end.

The connector pin and the rotating stud have ends in contact within the outer housing. One or more electrical contact rings are arranged within the outer housing. The electrical contact ring(s) include at least one contact extension biased to contact the rotating stud, such as by a spring force. For example, each contact extension may include one or more layers each with a plurality of fins surrounding the rotating stud.

As disclosed herein, the electrical contact rings provide a more solid form of electrical contact which will produce a more stable connection for the weld. As a result, less heat will be generated at the interface. Needle arcing will not be as prominent which lead to premature failure previously.

Furthermore, in some examples, the rotating power connector includes one or more bearings about the rotating stud, such as a needle roller bearing, to provide mechanical stability and free rotation of the stud. The bearing provides greater alignment and/or resists side loading (e.g., deviation from the axial direction), which may influence proper operation of the entire robotic system, thereby prolonging the useful life of the assembly. Smoother, more free rotation of the assembly results, allowing for reliable operation and greater life for the unicable assembly.

Advantageously, the disclosed rotating power connection provides stable electrical contact between rotating members and the connector pin, while bearings provide mechanical support and smooth rotation, relieving strain on the attached unicable. Additionally, the rotating power connection and the components therein are dimensioned to fit into housings, robot arms, etc., of existing welding systems, thereby allowing for hassle-free exchange between existing rotating power connections and/or rotating power connectors as disclosed herein.

In disclosed examples, a rotating power connector for an electric welding torch includes an outer housing having a longitudinal axis; a connector pin arranged within the outer housing and extending from a first end of the outer housing; a stud arranged within the outer housing and extending from a second end of the outer housing; and one or more electrical contact rings arranged within the outer housing and encircling one or more of the connector pin or the stud, the one or more electrical contact rings including one or more contact extensions biased toward an external surface of the connector pin or the stud to provide electrical contact between the one or more contact extensions and the external surface during rotation of the rotating power connector relative to a unicable.

In some examples, the connector pin is configured to be inserted into a welding torch to connect the rotating power connector to the welding torch, the connecter pin to rotate relative to the one or more contact rings. In examples, the stud is connectable to the unicable and configured to rotate relative to the one or more contact rings. In some examples, each of the connector pin and stud comprises a central channel for communicating one or more of shielding gas or wire.

In examples, an inner housing is arranged within the outer housing and generally encasing the one or more contact rings. In some examples, the inner housing contacts the connector pin or the one or more contact rings to provide a current pathway for electric current from the stud through the contact ring or the inner housing and into the connector pin.

In some examples, a bearing arranged around the stud, the bearing facilitating rotation of the connector pin or the stud relative to the inner housing. In examples, the bearing includes a needle roller bearing arranged between a contact ring of the one or more contact rings and the first or second end of the outer housing.

In some examples, the one or more contact extensions includes a plurality of spring loaded, highly conductive fins. In some examples, each of the plurality of fins is fixed to a respective contact ring at a first end and biased to urge the fins inward toward engagement with the external surface at a second end, or at portion between the first end and the second end.

In disclosed examples, an assembly for rotational movement of a welding torch unicable includes a connector that rotatably connects a welding torch unicable to a welding torch body such that the unicable is rotatable relative to the torch body. The connector includes a cylindrical outer housing having a longitudinal axis; a connector pin fixedly, axially arranged within the outer housing and extending from a first end of the outer housing; a rotating stud arranged within the outer housing and extending from a second end of the outer housing opposite the first end; an inner housing within the outer housing, wherein the connector pin is in electrical contact with the inner housing; and one or more contact rings arranged within and in electrical contact with the inner housing, each of the one or more contact rings including at least one contact extension biased to contact the rotating stud during rotational movement thereof.

In some examples, each of the unicable, rotating stud and connector include a passageway along a common axis for transmission of a welding wire or a shielding gas to the welding torch. In some examples, the rotating stud of the connector is connectable to the unicable.

In disclosed examples, a rotating power connector for an electric welding torch includes an outer housing having a longitudinal axis; a connector pin arranged within the outer housing and extending from a first end of the outer housing; a stud arranged within the outer housing and extending from a second end of the outer housing; and one or more contact extensions arranged within the outer housing and encircling one or more of the connector pin or the stud, the one or more contact extensions biased toward an internal surface of an inner housing to provide electrical contact between the one or more contact extensions and the internal surface during rotation of the rotating power connector relative to a unicable.

In some examples, the one or more contact extensions includes a plurality of fins, each fin having a first end and a second end. In examples, each of the plurality of fins is fixed to an external surface of the connector pin or the stud at the first end and biased to urge the fins outward toward engagement with the internal surface at the second end.

In some examples, the connector pin is configured to be inserted into a welding torch to connect the rotating power connector to the welding torch, the connecter pin to rotate relative to the inner housing. In examples, the stud is connectable to the unicable and configured to rotate relative to the inner housing.

In some examples, a bearing arranged around the stud or the contactor pin, the bearing facilitating rotation of the connector pin or the stud relative to the inner housing. In examples, the bearing includes a needle roller bearing arranged between the one or more contact extensions and the first or second end of the outer housing.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, Carbon Arc Cutting-Air (e.g., CAC-A), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "welding program" or "weld program" includes at least a set of welding parameters for controlling a weld. A welding program may further include other software, algorithms, processes, or other logic to control one or more welding-type devices to perform a weld.

Turning now to the figures, FIG. 1 provides a perspective view of an example robotic welding system employing a rotating power connector. An electric welding torch 10 (e.g., a gas metal arc welding (GMAW) torch, a metal inert gas (MIG) torch, etc.) is comprised of a torch body having a main housing 12, a gooseneck 14, and a contact tip or nozzle assembly 16, a power cable, such as a unicable assembly 18, and a power pin (not shown) that mates with the wire feeder 20. The shielding gas, electrical current, and a consumable electrode (e.g., a welding wire) are channeled through the torch 10 to output a welding arc at the nozzle assembly 16. In some examples, a rotating power connector is arranged within the main housing 12, providing a conducting assembly between the unicable assembly 18 and the main housing 12.

The unicable assembly 18 may include one or more of a core tube, copper cabling, or shielded lead wires, as a non-limiting list of examples. The unicable 18 may be connected to a wire feeder 20 opposite the main housing 12 of the welding torch 10. The gooseneck 14 is operatively connected to a forward end of the main housing 12 and allows for the communication of the consumable electrode, the shielding gas, and/or the welding current to the nozzle assembly 16 mounted on the gooseneck. The welding torch 10 is coaxially mounted to a robotic arm 22 such that the unicable 18 is arranged along the center axis of the robotic arm 22. However, the welding torch 10 may be mounted to a robotic arm in a disposition other than a coaxially mounted disposition. In some examples, the robotic arm 22 is configured to rotate the welding torch 10 in direction 11, as well as rotate in direction 13, generally about the center axis of the robotic arm 22. For instance, a motor or other actuator 23 is employed to control movement of the welding torch 10 via the main housing 12 in one or more directions 13.

The wire feeder 20 feeds the welding wire through the unicable 18, main housing 12, gooseneck 14, and ultimately through an opening in the contact tip/nozzle assembly 16 at the forward end of the welding torch 10. The welding wire, when energized for welding, carries a high electrical potential. When the welding wire arcs with metal workpieces, an electrical circuit is completed and current flows through the welding wire, across the arc to metal workpieces and to a ground or other type of current return. The arc causes the welding wire and the metal of the workpieces to melt, thereby joining the workpieces as the melt solidifies.

FIG. 2 illustrates an example rotating power connector 26. As shown, a rotating stud 40 is configured to mate with an end of the unicable 18, providing a connection to the rotating power connector 26. The unicable 18 may be removably or permanently fixed to the rotating power connector 26 by one or more fasteners, such as threaded portion 51, locking screws, and/or set screws, as a list of non-limiting examples.

The rotating power connector 26 includes a generally cylindrical outer housing 30 having a longitudinal axis 32. A connector pin 34 is removably or fixedly arranged within the outer housing 30, aligned with the axis 32 and extending from an end of the rotating power connector 26 opposite the rotating stud 40. The connector pin 34 may be generally tubular with a flange portion 38 that secures the connector pin to the outer housing 30. A rotating member such as rotating stud 40 is rotatably arranged within the outer housing 30 aligned with the axis 32. The rotating stud 40 is also generally tubular with a flange portion 46 at its end. An opposite end portion 48 of the rotating stud 40 is arranged outside of the outer housing 30 and is insertable into and connectable to an end of the unicable 18. One or more washers, O-rings 49 or similar seals are arranged at the end of the outer housing 30 from which the rotating stud 40 or the connector pin 34 extends.

An inner housing 50 is arranged within the outer housing 30. The inner housing 50 generally extends from one end of the outer housing to the other end and extends to overlap the interface between the connector pin 34 and the rotating stud 40. The inner housing 50 generally surrounds the rotating stud 40 and supports the connector pin 34 and the rotating stud. One or more electrical contact rings 52, 53 are arranged within the outer housing 30 and between the inner housing 50 and the rotating stud 40. In examples, each contact ring 52, 53 encircles the rotating stud 40 and includes at least one contact extension 54, 55, which is an extension that contacts the rotating stud 40.

Figure 3A:
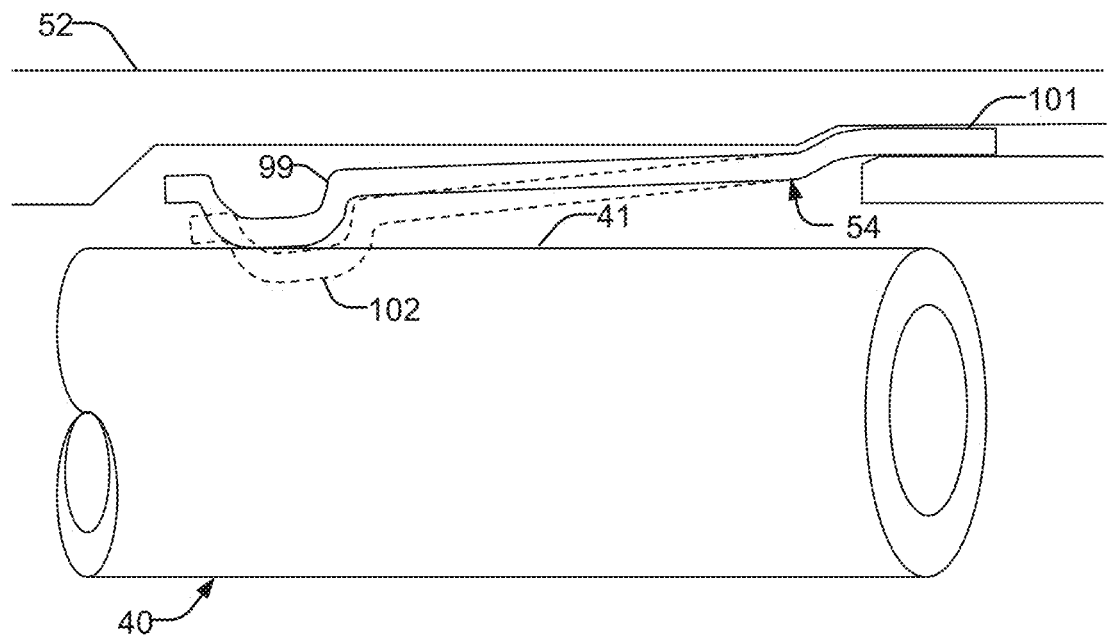
FIGS. 3A to 3E illustrates a perspective view of the example rotating power connector of FIG. 2A, in accordance with aspects of this disclosure.
Figure 3B:
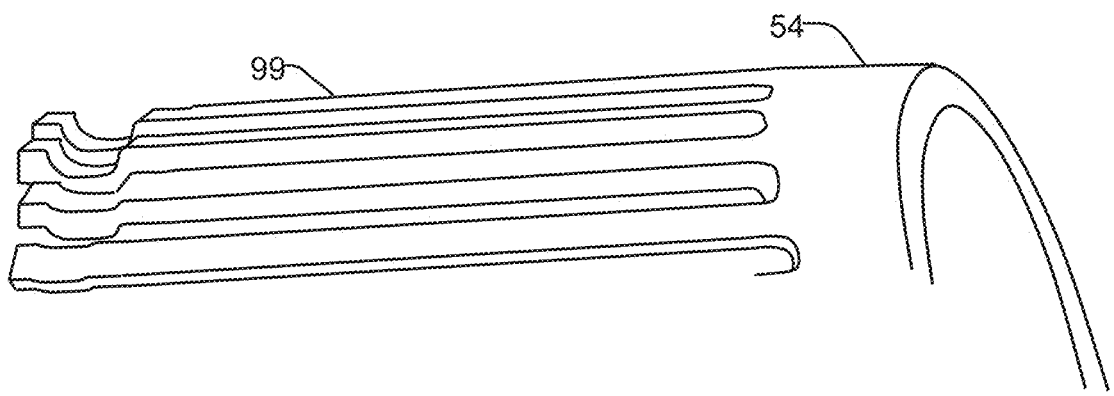
Figure 3C:
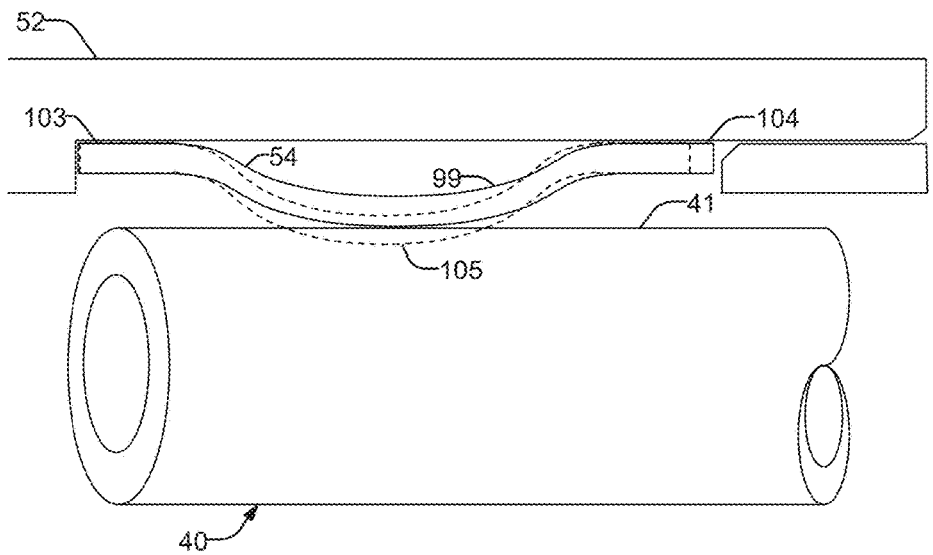

For example, as shown in example FIGS. 3A to 3E, a contact ring 52 may include multiple contact extensions 54, such as one or more layers and/or spring-loaded, highly conductive fins 99. In some examples, each layer may include a plurality of fins surrounding the rotating stud 40, although the rotating power connector 26 is not limited to any specific number of contact extensions/fins/supporting layers. In some examples, the contact extensions 54 may be fixed to the contact ring 52 at a first end 101, and biased to contact a surface 41 of the rotating stud 40 at a second end 102. In some examples as shown in FIG. 3C, the contact extension 54 may be fixed to the contact ring 52 at one end 103, and be configured to move (e.g., slide) within the contact ring 52 at another end 104, with a center portion 105 flexing toward the rotating stud 40, thereby ensuring electrical contact as the rotating stud 40 rotates relative to the contact ring 52.

Figure 3D:
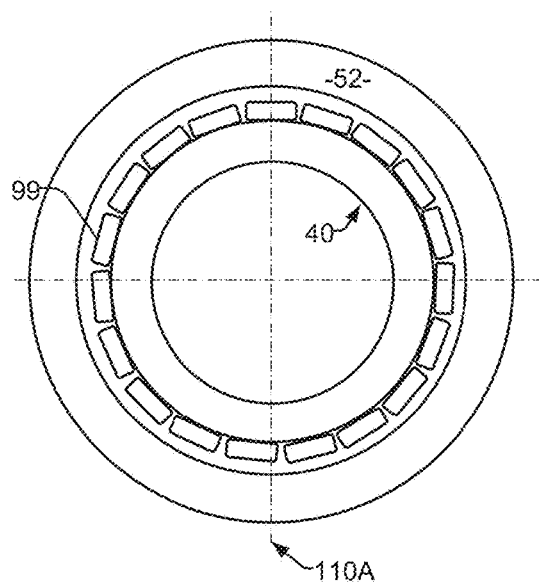
Figure 3E:
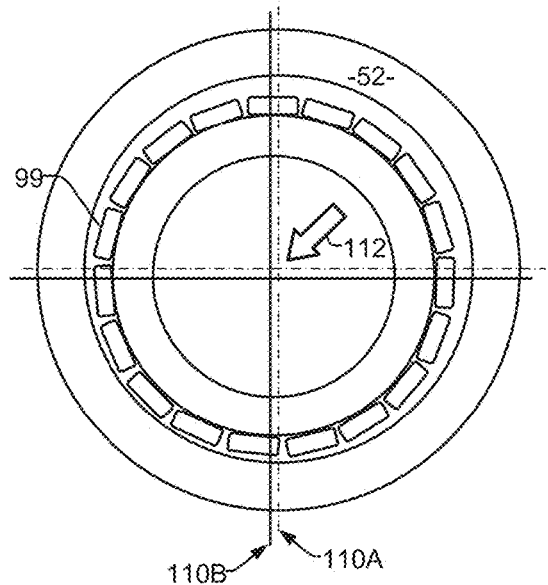

The arrangement and configuration of the radially oriented spring loaded, highly conductive fins 99 also tolerates degrees of misalignment between the contact ring 52 and the rotating stud 40 as a result of manufacturing, assembly, and/or wear of these parts. Example FIGS. 3D and 3E provide a cross-sectional view of the contact ring 52, fins 99, and rotating stud 40. For instance, FIG. 3D illustrates rotating stud 40 in coaxial alignment with contact ring 52, such that each of the contact ring 52 and rotating stud 40 share a common axis 110A. If movement of the rotating stud 40 results in misalignment, the rotating stud 40 may be pushed (e.g., in direction 112), which may cause misalignment between the rotating stud 40 and the contact ring 52. For example, the rotating stud 40 corresponds to a second axis 110B offset from the axis 110A of the contact ring 52. In such a situation, the fins 99 maintain secure contact with the rotating stud 40, as the fins 99 are spring loaded toward the rotating stud 40.

A bearing 56 also encircles the rotating stud 40 to support the stud during rotational movement. The bearing 56 may be arranged about the rotating stud 40 between the contact rings 52, 53 and the flanged end 46 of the rotating stud 40. In some examples, the bearing 56 is a needle roller bearing employing relatively long and/or thin cylindrical rollers resembling needles. Needle bearings can be used to surround the rotating stud 40 in order to reduce the friction and withstand any bending/misalignment force between the rotating stud 40 and the connector pin 34. Needle bearings may be thinner and provide a slimmer profile between the rotating stud 40 and the inner housing 50. In some examples, other types of bearings may be used to suit a specific application.

A resilient biasing member 58, such as a wave spring or similar, can be arranged between the bearing 56 and the flanged end 46 of the rotating stud 40. This biasing member 58 provides limited axial movement between the rotating stud 40 and the bearing 56. By use of the disclosed bearing 56, axial movement of the rotating connector does not disrupt contact between the rotating stud 40 and the contact ring 52 (and/or contact extension 54). For example, when the rotating power connector 26 is connected to an unicable 18, articulation of the unicable 18 may compress, extend, or bend the rotating stud 40 within the housing 30. By use of the biasing member 58, a degree of axial flexibility or support is provided along a length of the rotating stud 40.

In some examples, the inner housing 50 is configured to receive the contact rings 52, 53 such that each is fixed relative to the housing. The contact extensions 54, 55 (e.g., fins) are biased toward the surface 41 to make electrical contact with the rotating shaft 40. In some examples, the contact extensions 54, 55 are built into or incorporated with the inner housing 50.

As provided in the disclosed figures, the rotating power connector 26 allows for the transfer of electricity, as electrical current may pass from the rotating stud 40 through contact extensions 54, 55, and into the connector pin 34. The interface between the outer surface 41 and contact extensions 54, 55 is a sliding interface along the path of the current transferring to the rotating power connector 26. Other interfaces are fixed or solid connections and are not moveable. For instance, the connector pin 34 and rotating stud 40 may be made of an electrically conductive materials. The inner housing 50 may be made of an electrically conductive materials, and the contact rings 52, 53 may be made of an electrically conductive materials. The outer housing 30 may be made of an insulating materials such as a plastic or similar, thereby shielding the outside of the rotating power connector 26 from short-circuiting to external components and/or devices (e.g., the robotic arm 22).

Figure 2C:
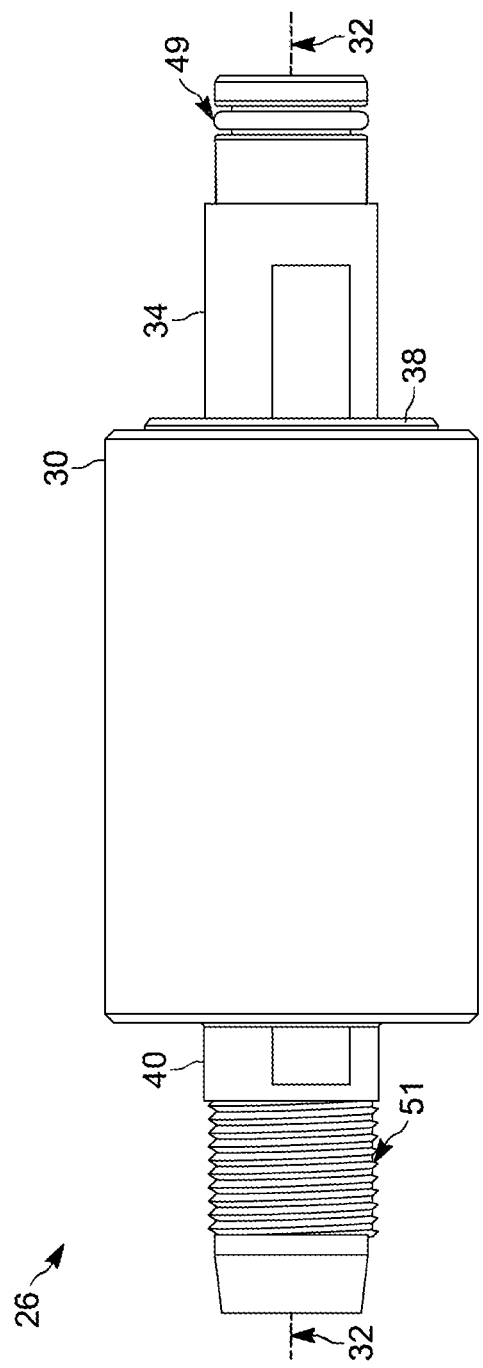
FIG. 2C illustrates a perspective view of the example rotating power connector of FIG. 2A, in accordance with aspects of this disclosure.

The tubular connector pin 34 and tubular rotating stud 40 are axially aligned along the longitudinal axis 32 of the outer housing 30, forming a hollow channel 66. In this arrangement, the connector pin 34 and rotating stud 40 communicate welding consumables (e.g., electrode wire, welding shielding gas, etc.) through the hollow channel 66. FIG. 2C provides an illustration of the example rotating power connector 26 enclosed in the housing 30, with the tubular connector pin 34 and tubular rotating stud 40 extending therefrom.

In some examples, one or more of the contact extensions 54, 55 are arranged within and/or integrated with one or more of the connector pin 34 or the rotating stud 40 of the rotating power connector 26. For instance, the contact extensions 54, 55 are biased toward an internal surface 43 of the inner housing 50 to provide electrical contact between the one or more contact extensions 54, 55 and the internal surface 43 during rotation of the rotating power connector 26 relative to a unicable 18.

For example, the one or more contact extensions 54, 55 (e.g., a plurality of fins) are configured with a first end and a second end. In some examples, each contact extension is fixed to an external surface of the rotating stud 40 at the first end and biased to urge the fins outward toward engagement with the internal surface 43 at the second end.

In some examples, one or more contact rings 52, 53 is not employed. In some examples, one or more contact rings 52, 53 are used to encircle the rotating stud 40, with the one or more contact extensions 54, 55 arranged on around the one or more contact rings 52, 53. For instance, the one or more contact extensions 54, 55 extend from an external surface of the one or more contact rings 52, 53 and oriented outward to contact the inner surface 43 of the inner housing 50.

In some examples, one or more of the contact extensions 54, 55 are arranged within and/or integrated with the inner housing 50 of the rotating power connector 26 and biased to contact the rotating stud 40 without the use of a contact ring.

Figure 4:
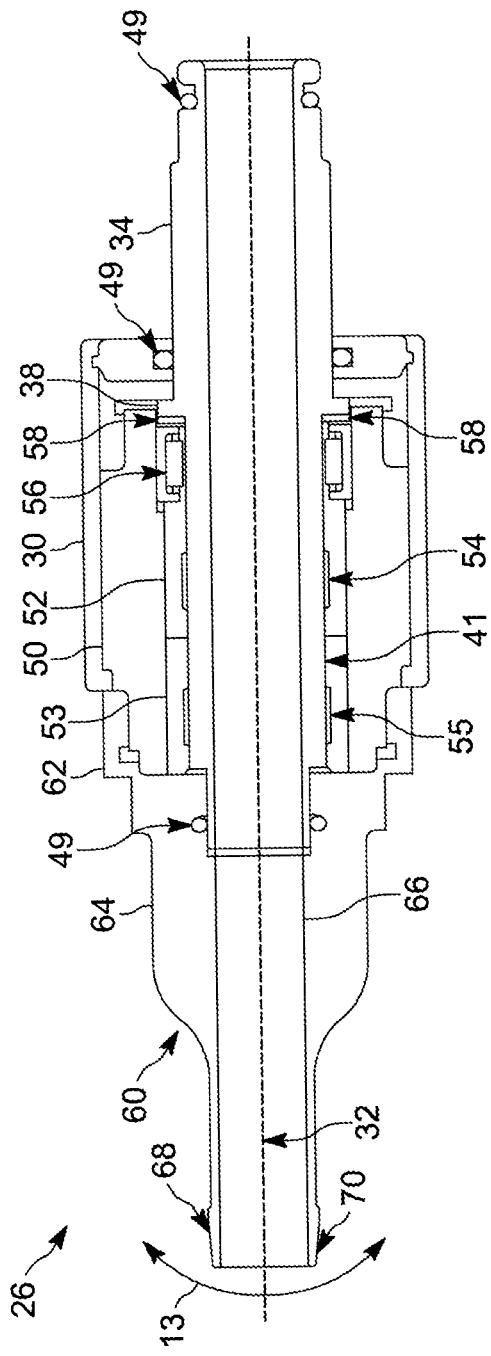
FIG. 4 illustrates a sectional view of an example rotating power connector, in accordance with aspects of this disclosure.

FIG. 4 illustrates another example rotating power connector 26 configured with an integrated direct crimp-on connection 60 (e.g., a crimped-style fitting, a compression fitting, a threaded compression fitting, etc.). As shown, the direct crimp-on connection 60 is secured to the insert housing 50 via a fastener 62, such as a thread and set screw connection, but may also include a press-fit, knurled press-fit, snap-fit, screws, bolts, adhesive, a weld, braze, or other type of fastener. In some examples, the fastener 62 is secured to the outer housing 30. Conductive wires (e.g., copper wires) of the unicable 18 are crimped on the tapered surface 64 to form a solid electric connection between the unicable 18 and the crimp-on connection 60. One or more O-rings 49 create a seal between the rotating power connector 26 and the crimp-on connection 60, such that the shielding gas does not leak out of the channel 66, and the lubricant grease does not leak into the channel 66.

Figure 5:
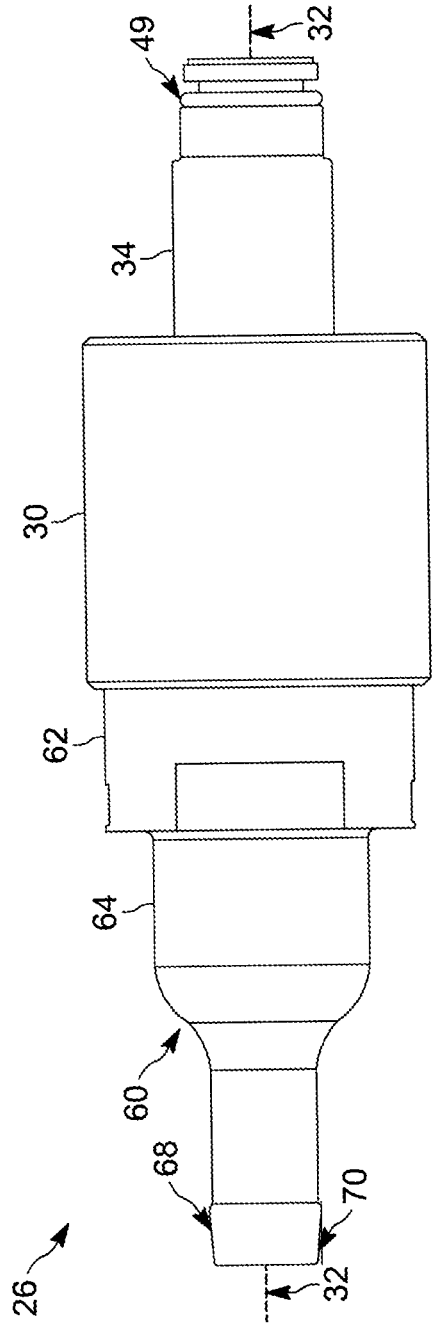
FIG. 5 illustrates a perspective view of the example rotating power connector of FIG. 4, in accordance with aspects of this disclosure.

The crimp-on connection 60 includes a male connection with a flared tip 70 and ridge 68, such that a core tube from the unicable 18 is secured by a snap-in feature. FIG. 5 provides an illustration of the example rotating power connector 26 enclosed in the housing 30 with the crimp-on connector 60 extending from a first end of the outer housing 30 and the tubular connector pin 34 extending from a second, opposite end.

In the example of FIGS. 4 and 5, once mated with an unicable, one or more power conductors connect directly to the inner housing 50. For instance, the inner housing 50 is arranged to conduct power through the electrical contact rings 52, 53 via extensions 54, 55, and into the connector pin 34. Electrical current then flows through the connector pin 34 and towards the contact tip.

With reference to the figures, the connector pin 34 of the rotating power connector 26 is configured to plug into the main housing 12, thereby connecting the unicable 18 to the nozzle assembly 16 of the welding torch 10. In some examples, a single electrical contact ring 52 is employed. In some examples, three or more electrical contact rings 52, 53 are employed. In some examples, two or more bearings 56 are employed, such as arranged about the tubular rotating stud 40 and bracketing the one or more electrical contact rings 52, as illustrated in FIG. 2B.

The rotating stud 40 and/or the crimp-on connection 60 extends from an end of the rotating power connector 26 opposite the connector pin 34, and connects to the unicable 18. When employed with the welding torch 10, the rotating power connector 26 allows the unicable 18 to rotate relative to the main housing 12. The rotatable movement of the unicable 18 provides relief to the otherwise rigid connection through the welding torch 10, significantly reducing the amount of stress on the unicable, extending the useful life of the unicable, which may fail under cyclical or repetitive twisting movements. The rotating power connector 26 also allows for the efficient passage of one or more of electrical current, welding wire, and/or shielding gas from the unicable 18 to the nozzle assembly 16, which is a feature for some welding processes (e.g., a MIG welding process, etc.).

In some examples, when the useful life of the rotating power connector 26 has ended, the entire assembly of the unicable 18 and rotating power connector 26 is discarded and replaced in order to replace the rotating power connector. In some examples, the rotating power connector 26 (and/or one or more components therein) is a replaceable component that can be discarded and replaced with another rotating power connector by loosening the fastener(s), separating the unicable 18 from the rotating power connector 26, and attaching a new rotating power connector to the unicable 18. In some examples, the rotating stud 40 and/or the crimp-on connection 60 can be incorporated with the main housing 12 (e.g., via a built in and/or fixed connection), such that the connector pin 34 mates with the unicable 18 (e.g., via a quick-connecting mechanism). In some examples, one or both ends of the rotating power connector 26 are fixedly and/or solidly connected to the unicable 18 and/or the main housing 12

In some examples, the connection pin 34 and/or rotating stud 40 are described as male-type connections. In some examples, one or both of the connection pin 34 and/or rotating stud 40 can be female-type connections. In some examples, one or both of them can also be flange in the connection design. In some examples, a female connection (e.g., the connection pin 34 and/or rotating stud 40) can be integrated into the inner housing 50.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A rotating power connector for an electric welding torch comprising:
    an outer housing having a longitudinal axis;
    a connector pin arranged within the outer housing and extending from a first end of the outer housing;
    a stud arranged within the outer housing and extending from a second end of the outer housing; and
    one or more electrical contact rings arranged within the outer housing and encircling the connector pin or the stud, the one or more electrical contact rings including one or more contact extensions biased toward an external surface of the connector pin or the stud to provide electrical contact between the one or more contact extensions and the external surface during rotation of the rotating power connector relative to a unicable.

2. The rotating power connector of claim 1, wherein the connector pin is configured to be inserted into a welding torch to connect the rotating power connector to the welding torch, the connecter pin to rotate relative to the one or more contact rings.

3. The rotating power connector of claim 1, wherein the stud is connectable to the unicable and configured to rotate relative to the one or more contact rings.

4. The rotating power connector of claim 3, wherein each of the connector pin and stud comprises a central channel for communicating one or more of shielding gas or wire.

5. The rotating power connector of claim 1, further comprising an inner housing arranged within the outer housing and generally encasing the one or more contact rings.

6. The rotating power connector of claim 5, wherein the inner housing contacts the connector pin or the one or more contact rings to provide a current pathway for electric current from the stud through the contact ring or the inner housing and into the connector pin.

7. The rotating power connector of claim 1, further including one or more bearings arranged around the stud, the bearing facilitating rotation of the connector pin or the stud relative to the inner housing.

8. The rotating power connector of claim 7, wherein the bearing includes a needle roller bearing arranged between a contact ring of the one or more contact rings and the first or second end of the outer housing.

9. The rotating power connector of claim 1, wherein the one or more contact extensions includes a plurality of spring loaded, highly conductive fins.

10. The rotating power connector of claim 9, wherein each of the plurality of fins is fixed to a respective contact ring at a first end and biased to urge the fins inward toward engagement with the external surface at a second end, or at portion between the first end and the second end.

11. An assembly for rotational movement of a welding torch unicable, the assembly comprising:
    a connector that rotatably connects a welding torch unicable to a welding torch body such that the unicable is rotatable relative to the torch body, the connector including:
    a cylindrical outer housing having a longitudinal axis;
    a connector pin fixedly, axially arranged within the outer housing and extending from a first end of the outer housing;
    a rotating stud arranged within the outer housing and extending from a second end of the outer housing opposite the first end;
    an inner housing within the outer housing, wherein the connector pin is in electrical contact with the inner housing; and
    one or more contact rings arranged within and in electrical contact with the inner housing, each of the one or more contact rings including at least one contact extension biased to contact the rotating stud during rotational movement thereof.

12. The assembly of claim 11, wherein the each of the unicable, rotating stud and connector include a passageway along a common axis for transmission of a welding wire or a shielding gas to the welding torch.

13. The assembly of claim 11, wherein the rotating stud of the connector is connectable to the unicable.

14. A rotating power connector for an electric welding torch comprising:

an outer housing having a longitudinal axis;

a connector pin arranged within the outer housing and extending from a first end of the outer housing;

a stud arranged within the outer housing and extending from a second end of the outer housing; and one or more contact extensions arranged within the outer housing and encircling one or more of the connector pin or the stud, the one or more contact extensions biased toward an internal surface of an inner housing to provide electrical contact between the one or more contact extensions and the internal surface during rotation of the rotating power connector relative to a unicable.

15. The rotating power connector of claim 14, wherein the connector pin is configured to be inserted into a welding torch to connect the rotating power connector to the welding torch, the connecter pin to rotate relative to the inner housing.

16. The rotating power connector of claim 14, wherein the stud is connectable to the unicable and configured to rotate relative to the inner housing.

17. The rotating power connector of claim 14, wherein the one or more contact extensions includes a plurality of fins, each fin having a first end and a second end.

18. The rotating power connector of claim 17, wherein each of the plurality of fins is fixed to an external surface of the stud at the first end and biased to urge the fins outward toward engagement with the internal surface at the second end.

19. The rotating power connector of claim 14, further including one or more bearings arranged around the stud or the contactor pin, the bearing facilitating rotation of the connector pin or the stud relative to the inner housing.

20. The rotating power connector of claim 19, wherein the bearing includes a needle roller bearing arranged between the one or more contact extensions and the first or second end of the outer housing.

\* \* \* \* \*